E. H. ANGLE.
ORTHODONTIC APPLIANCE.
APPLICATION FILED APR. 29, 1920.
1,366,628.
Patented Jan. 25, 1921.
2 SHEETS—SHEET 1.
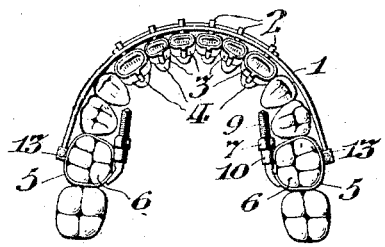
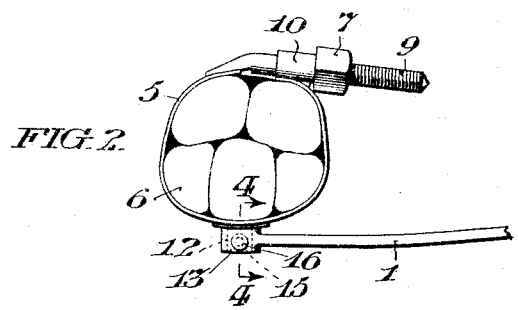
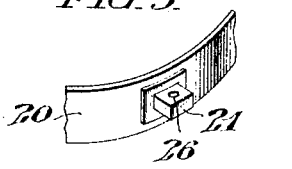
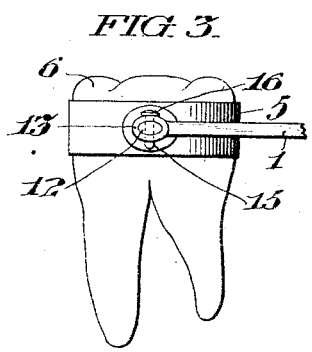
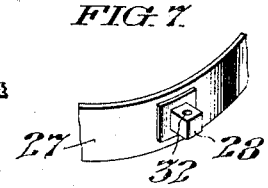
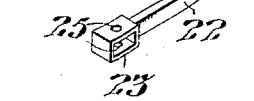
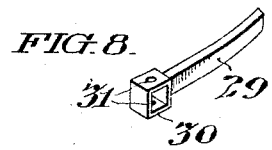
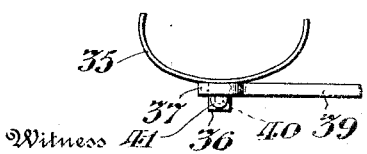
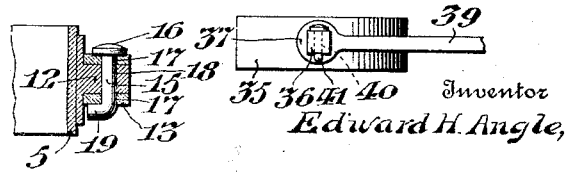
Inventor
Edward H. Angle,
By Clifton C. Caldwell
Attorney
Witness
Elsie F. Jentzsch.

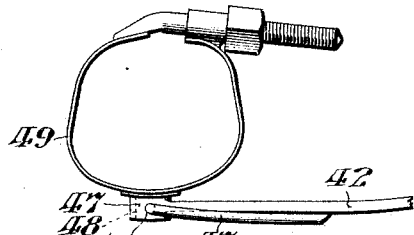
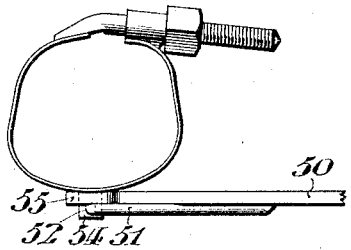
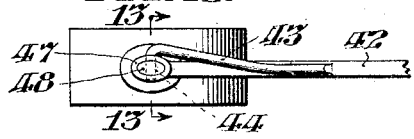
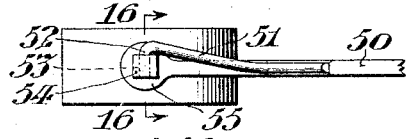
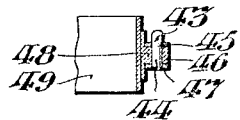
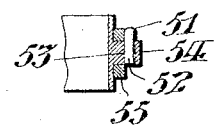
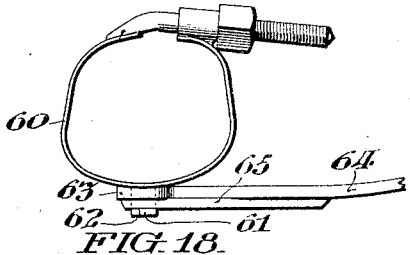
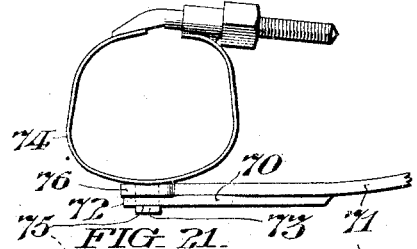
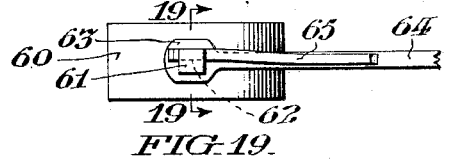
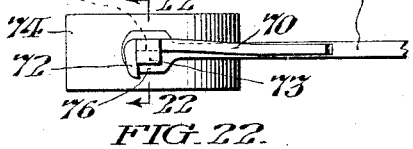
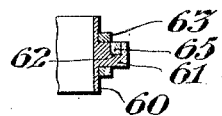
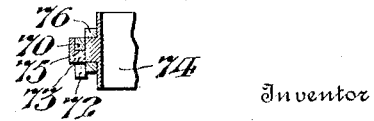

UNITED STATES PATENT OFFICE.

EDWARD H. ANGLE, OF PASADENA, CALIFORNIA.

ORTHODONTIC APPLIANCE.

1,366,628.  Specification of Letters Patent.  Patented Jan. 25, 1921.

Application filed April 29, 1920. Serial No. 377,424.

*To all whom it may concern:*

Be it known that I, EDWARD H. ANGLE, a citizen of the United States, and a resident of Pasadena, in the county of Los Angeles, State of California, have invented certain new and useful Improvements in Orthodontic Appliances, of which the following is a specification, reference being had to the accompanying drawings.

My invention relates to the art of regulation of the teeth, particularly to that class of devices in which an arch-bar is adjustably supported at its opposite ends, and detachably connected intermediate of its ends with selected teeth of the dental arch, and is especially directed to the connection between the arch-bar and the terminal anchorages.

The principal objects of my invention are to provide means for connecting the arch-bar with the terminal anchorages, so constructed and arranged as to afford a rigid union, and facilitate the engagement of said arch-bar with said anchorage and its removal therefrom.

Other objects of my invention are to provide such a connection between the terminal anchorage and the arch-bar that said arch-bar may be withdrawn buccally without affecting its connection with the intermediate teeth of the dental arch, to which it may be attached.

Further objects of my invention are to so simplify the structures connecting the terminal anchorages and arch-bar as to minimize the discomfort to the wearer.

Specifically stated, the form of my invention as hereinafter described, comprehends an anchor-band having a radially extended stud, spur or projection over which a sheath or collar having a corresponding aperture forming an eye, on the end of the arch-bar may be slipped and engaged by a lock-pin or key inserted in a suitably-formed keyway.

My invention also includes all of the various novel features of construction and arrangement as hereinafter more definitely specified.

In the accompanying drawings, Figure 1 is a plan sectional view of a human dental arch showing a convenient embodiment of my invention attached to selected teeth thereof; Fig. 2 is an enlarged plan view of one of the molars shown in Fig. 1, and the anchorage attachment applied thereto; Fig. 3 is a side elevational view of the structure shown in Fig. 2 applied to said molar; Fig. 4 is an enlarged sectional view taken on the line 4—4 in Fig. 2; Fig. 5 is a fragmentary perspective view showing a modification of the anchor-band shown in Figs. 1 to 4 inclusive; Fig. 6 is a perspective view of the arch-bar terminal sheath which is arranged to be attached to the anchor-band shown in Fig. 5; Fig. 7 is a perspective view of modification of the structure shown in Fig. 5; Fig. 8 is a perspective view of the arch-bar terminal sheath which is arranged to be attached to the anchor-band shown in Fig. 7; Fig. 9 is a plan view showing a modification of the structure shown in Figs. 1 to 4 inclusive; Fig. 10 is a side elevational view of the structure shown in Fig. 9; Fig. 11 is a plan view of an anchor-band of the form illustrated in Figs. 1 to 4 inclusive, having attached thereto an arch-bar embodying a slight modification of the structure shown in said figures; Fig. 12 is a side elevational view of the structure shown in Fig. 11; Fig. 13 is a sectional view of the structure illustrated in Figs. 11 and 12, taken on the line 13—13 in Fig. 12; Fig. 14 is a plan view of the anchor-band illustrated in Figs. 9 and 10, showing an arch-bar embodying a slight modification of the arch-bar illustrated in Figs. 9 and 10; Fig. 15 is a side elevational view of the structure shown in Fig. 14; Fig. 16 is a sectional view of the structure shown in Figs. 14 and 15, taken on the line 16—16 in Fig. 15; Fig. 17 is a plan view of another modification of my invention; Fig. 18 is a side elevational view of the structure illustrated in Fig. 17; Fig. 19 is a sectional view of the structure shown in Figs. 17 and 18, taken on the line 19—19 in Fig. 18; Fig. 20 is a plan view of a modification of the structure shown in Figs. 17, 18 and 19; Fig. 21 is a side elevational view of the structure illustrated in Fig. 20; and Fig. 22 is a sectional view of the structures shown in Figs. 20 and 21, taken on the line 22—22 in Fig. 21.

The tooth regulating appliance to which this invention is particularly applicable is indicated in a general way in Fig. 1, and includes, together with the associate parts, an arch-bar 1 consisting of a preferably flattened wire having its intermediate portion arranged to be engaged with brackets 2, on suitably formed tooth-bands 3 on selected anterior teeth 4 of the dental arch, and its terminals engaged with the anchor-bands 5.

As shown in Figs. 1, 2 and 3, the anchor-band 5 is attached to selected posterior or molar teeth 6 by the adjusting nut 7, which is rotatably mounted on the threaded stem 9 projecting from one end of said anchor-band 5, and extends through the eye 10 on the opposite end of said anchor-band, whereby the opposed ends of said anchor-band may be drawn together to clamp it upon said molar tooth in a well known manner.

As illustrated in Figs. 2, 3 and 4, the anchor-band 5 is provided with the stud or spur 12 which may be of any desired form, being shown in Fig. 3 as having an oval configuration, and adapted to receive the sheath or collar 13, forming the terminal of the arch-bar 1, and having a contour similar to the stud or spur 12, and snugly fitting thereon so as to be substantially rigid therewith.

The collar 13 is arranged to be prevented from accidental displacement from said spur 12 by the lock-pin 15 which may preferably be provided with the head 16, its shank being extended through alined apertures 17 and 18 in the walls of said collar 13, and in said spur 12, respectively, and having its free end 19 turned or bent over as best shown in Fig. 4, to retain it therein.

The form of my invention illustrated in Figs. 5 and 6 is similar to that shown in Figs 1 to 4 inclusive, except that the anchor-band 20 is provided with a spur 21, having an oblong rectangular configuration, and the arch-bar 22 has its terminal sheath or collar 23 shaped to conform to said rectangular spur, the walls of said collar 23 and the spur 21 having alined apertures 25 and 26 respectively, for the reception of a lock-pin similar to the lock-pin 15 best shown in Fig. 4.

The form of my invention illustrated in Figs. 7 and 8 is similar to that shown in Figs. 1 to 4 inclusive except that the anchor-band 27 is provided with a spur 28 having a square configuration, and the arch-bar 29 has its terminal sheath or collar 30 shaped to conform to said square spur, the walls of the collar 30 and the spur 28 having alined apertures 31 and 32 respectively, for the reception of a lock-pin similar to the lock-pin 15 best shown in Fig. 4.

In the form of my invention illustrated in Figs. 9 and 10, the anchor-band 35 is provided with a stud or spur 36 which is shown square, but may be of any desired configuration and projects radially or laterally beyond the outer surface of the collar 37 forming the terminal of the arch-bar 39, and is provided with the aperture 40 in that portion extending beyond said collar for the reception of the lock-pin 41, which is arranged to retain said collar 37 on the spur 36 without passing through said collar.

The form of my invention illustrated in Figs. 11, 12 and 13 is similar to that shown in Figs. 1 to 4 inclusive, except that the arch-bar 42 is provided with the spring-latch 43 attached thereto, and having its free end 44 directed through the apertures 45 and 46 in the walls of the terminal collar 47 and the spur 48 on the tooth band 49.

The form of my invention illustrated in Figs. 14, 15 and 16 is similar to that shown in Figs. 9 and 10, except that the arch-bar 50 is provided with the spring-latch 51 attached thereto and having its free end 52 extended through the aperture 53 in that portion of the spur 54 which extends beyond the terminal collar 55 of said arch-bar 50.

In the form of my invention illustrated in Figs. 17, 18 and 19, the anchor-band 60 is provided with the spur 61 having the slot or recess 62 therein, disposed beyond the outer surface of the terminal collar 63 of the arch-bar 64 which carries the spring latch-bar 65 arranged to lie in said slot or recess 62 to retain said collar on the spur 61.

The form of my invention illustrated in Figs. 20, 21 and 22 is similar to that shown in Figs. 17, 18 and 19, except that the latch-bar 70 on the arch-bar 71 is provided with the hook 72 arranged to so frictionally bear against the rear surface of the spur 73 of the anchor-band 74 as to prevent the accidental displacement of said latch-bar from the slot 75, whereby the retention of the collar 76 is assured.

It will be obvious that my invention is advantageous in that the terminal sheath or collar thus described may be engaged and disengaged laterally or radially with respect to the dental arch and to the anchor-band so as not to interfere in any way with its connection with the tooth-bands on the anterior teeth.

I do not desire to limit my invention to the precise details of construction and arrangement as herein set forth, as it is obvious that various modifications may be made therein without departing from the essential features of my invention as defined in the appended claims.

Having thus described my invention, I claim:—

1. An orthodontic appliance comprising an anchorage having a spur projecting from the surface thereof, and arranged to receive a sheath or collar on an arch-bar radially fitted thereon, and be rigidly engaged therewith.

2. An orthodontic appliance comprising an anchorage having a spur projecting from the surface thereof, and arranged to receive a sheath or collar on an arch-bar radially fitted thereon, and having a configuration arranged to prevent their relative rotation.

3. An orthodontic appliance comprising an anchor-band having a spur projecting from the surface thereof, and an arch-bar having a terminal member forming a sheath or collar telescopically fitted to said spur;

said spur and collar being of such configuration as to prevent relative rotation.

4. An orthodontic appliance comprising an anchor-band having a spur projecting from the surface thereof, and an arch-bar having a terminal member arranged to embrace said spur and be rigidly fitted thereto, and means arranged to prevent the accidental displacement of said collar from said spur.

5. An orthodontic appliance comprising an anchor-band having a spur projecting from the surface thereof, and an arch-bar having a terminal member forming a sheath or collar telescopically fitted to said spur; the spur and collar being provided with alined apertures arranged to receive a key extended therethrough.

6. An orthodontic appliance comprising an anchor-band having a spur projecting from the surface thereof, and an arch-bar having a terminal member forming a sheath or collar telescopically fitted to said spur, and a latch carried by said arch-bar and arranged to engage said spur to retain said collar thereon.

7. An orthodontic appliance comprising an anchor-band having a spur projecting from the surface thereof, and an arch-bar having a terminal member forming a sheath or collar telescopically fitted to said spur, and a spring latch having means extended through said spur to retain said collar thereon.

8. An orthodontic appliance comprising an anchor-band having a spur projecting radially from the surface thereof, and an arch-bar having a terminal member forming a sheath or collar fitted to said spur, and a spring latch arranged to retain said collar on said spur.

9. An orthodontic appliance comprising an anchor-band having a spur projecting from the surface thereof, and an arch-bar having a terminal member forming a sheath or collar fitted to said spur, and a latch on said arch-bar having a hook arranged to engage said spur to retain said collar thereon.

10. An orthodontic appliance comprising an anchor-band having a spur projecting from the surface thereof, and provided with a slot, an arch-bar having a terminal member forming a sheath or collar fitted to said spur, and a latch on said arch-bar arranged to engage said slot to retain said collar on said spur.

11. An arch-bar arranged to engage a spur on an anchor-band, and having a latch arranged to retain said arch-bar on said spur.

12. An arch-bar arranged to engage a spur on an anchor-band, and having a spring latch arranged to retain said arch-bar on said spur.

13. An arch-bar having means to engage a spur on a tooth anchorage, and having a spring latch provided with a hook member arranged to engage said spur to retain said arch-bar in connected relation with said spur.

14. An arch-bar having a terminal member comprising an eye arranged to engage a spur on a tooth anchorage.

15. An arch-bar having a terminal member comprising an eye arranged to engage a spur on a tooth anchorage, and a spring latch extended across the aperture of said eye.

In witness whereof, I have hereunto set my hand this 22nd day of April, A. D. 1920.

EDWARD H. ANGLE.

Witnesses:
K. JARDINE,
H. H. LEHMAN.